(12) United States Patent (10) Patent No.: US 11,960,977 B2
Kumar et al. (45) Date of Patent: Apr. 16, 2024

(54) AUTOMATED ENHANCEMENT OF OPPORTUNITY INSIGHTS

(71) Applicant: Oracle International Corporation, Redwood Shores, CA (US)

(72) Inventors: Vivek Kumar, Redwood City, CA (US); Catherine You Francis, Berkeley, CA (US); Meeten Bhavsar, Emerald Hills, CA (US)

(73) Assignee: Oracle International Corporation, Redwood Shores, CA (US)

( * ) Notice: Subject to any disclaimer, the term of this patent is extended or adjusted under 35 U.S.C. 154(b) by 872 days.

(21) Appl. No.: 16/447,849

(22) Filed: Jun. 20, 2019

(65) Prior Publication Data

US 2020/0401932 A1 Dec. 24, 2020

(51) Int. Cl.
*G06N 20/00* (2019.01)
*G06F 16/953* (2019.01)

(52) U.S. Cl.
CPC ........... *G06N 20/00* (2019.01); *G06F 16/953* (2019.01)

(58) Field of Classification Search
CPC .............................. G06N 20/00; G06F 16/953
USPC .......................................................... 706/12
See application file for complete search history.

(56) References Cited

U.S. PATENT DOCUMENTS

| | | | |
|---|---|---|---|
| 10,489,462 B1* | 11/2019 | Rogynskyy | H04L 41/14 |
| 10,621,508 B2* | 4/2020 | Kataria | G06N 20/00 |
| 2008/0109399 A1* | 5/2008 | Liao | G06F 16/345 |
| 2011/0276372 A1* | 11/2011 | Spivack | G06Q 10/109 |
| | | | 705/14.5 |
| 2018/0268298 A1* | 9/2018 | Johansen | G06F 40/169 |
| 2019/0018835 A1* | 1/2019 | Bhowmick | G06F 16/90332 |
| 2020/0027170 A1* | 1/2020 | Archer, III | H04L 67/306 |
| 2020/0184016 A1* | 6/2020 | Roller | G06N 3/08 |

* cited by examiner

*Primary Examiner* — Hope C Sheffield
(74) *Attorney, Agent, or Firm* — Invoke

(57) ABSTRACT

Techniques for enhancing actionable opportunities through machine learning are disclosed. In some embodiments, a system includes an event listener for detecting an opportunity to perform an action using one or more computing resources. When a new opportunity is detected, the system generates a set of search criteria, which is used to search a set of external web resources for current events. The system may then generate, using a machine learning model as a function of one or more features extracted from current events satisfying the search criteria, a score representing a likelihood of success that the action leads to an optimal result. The system may tune the machine learning model based on feedback received that is indicative of how the current events affected the likelihood of success for the action.

20 Claims, 12 Drawing Sheets

MY OPEN OPPORTUNITIES... ▼

SHOW FILTERS

| WIN % | NAME | ACCOUNT | AMOUNT | CLOSE DATE | SALES STAGE | RECOMMENDED ACTION(S) |
|---|---|---|---|---|---|---|
| 90% △ | INFRASTRUCTURE TRANSFORMATION | SYSTEM SOLUTIONS, INC. | $80,000 | 10/17/18 | QUOTEPROPOSAL | CALL THIS ACOUNT TODAY REVIEW DECISION MAKER |
| 80% | SMARTER DC POWER SYSTEMS | NET-WORLD TECHNOLOGIES | $159,000 | 11/30/18 | INCONTRACT | |
| 75% | BIG DATA INITIATIVE | SIEMENS HEALTHINEERS | $150,000 | 1/15/19 | PRESENTATION | VERIFY THAT YOU HAVE CORRECT DECISION MAKER RESEARCH AND POSITION OUR BIG DATA CLOUD OFFERING |
| 70% △ | HIGH AVAILABILITY DEPLOYMENT | SCHNENK PROCESS | $550,000 | 1/27/19 | PRESENTATION | TAKE DIFFERENTIATED ACTION TO POSITION THIS DEAL COMPETITIVELY |
| 70% | CLOUD COMPUTING DEPLOYMENT | GLOBAL TECHNOLOGIES | $80,000 | 10/18/18 | BUILDINGVISION | |
| 60% | UNIFIED COMMUNICATION EXPANSION | ECLARI INC | $975,000 | 11/21/18 | BUILDINGVISION | READ TOP NEWS ABOUT THIS ACCOUNT |
| 50% | ELECTRONIC RECORD CONVERSION | HEAD STRONG ENGINEERING | $325,000 | 12/20/18 | DISCOVERY | CONSIDER WHETHER THIS DEAL SIZE IS ACHIEVABLE |
| 50% △ | GREEN DISASTER RECOVERY CENTER | HP SYSTEMS | $348,000 | 11/30/18 | DISCOVERY | UPDATE OPPORTUNITY STAGE AND WIN PROBABILITY |
| 30% | SOA INFRA CONVERSION | IBM SOFTWARES | $330,000 | 12/15/18 | QUALIFICATION | VERIFY THIS OPPORTUNITY IS STILL VIABLE |
| 30% | AUTOMATED MANUFACURING SOLUTIONS | PINNACLE TECHNOLOGIES | $80,000 | 11/11/18 | QUALIFICATION | |
| 45% | BIG DATA ANALYTICS DEPLOYMENT | WEST BANK | $1,200,000 | 12/21/18 | DISCOVERY | |
| 70% | DATA CENTER UPGRADE | PENYA BANK | $300,000 | 11/19/18 | BUILDINGVISION | |
| 50% | ENTERPRISE CRM IMPLEMENTATION | A. WOOD TURNING | $330,000 | 11/11/18 | BUILDINGVISION | |
| 30% | HOSTED SERVICES PLATFORM | IMAGE HOSPITALS | $40,000 | 12/17/18 | QUALIFICATION | |

FIG. 6A

| WIN % | NAME | ACCOUNT | AMOUNT | CLOSE DATE | SALES STAGE | RECOMMENDED ACTION(S) |
|---|---|---|---|---|---|---|
| 90% ▲ | INFRASTRUCTURE TRANSFORMATION | SYSTEM SOLUTIONS, INC. | $80,000 | 10/17/18 | QUOTEPROPOSAL | CALL THIS ACOUNT TODAY REVIEW DECISION MAKER |
| 80% | SMARTER DC POWER SYSTEMS | NET-WORLD TECHNOLOGIES | $159,000 | 11/30/18 | INCONTRACT | |
| 75% | BIG DATA INITIATIVE | SIEMENS HEALTHINEERS | $150,000 | 1/15/19 | PRESENTATION | VERIFY THAT YOU HAVE CORRECT DECISION MAKER RESEARCH AND POSITION OUR BIG DATA CLOUD OFFERING |
| 70% ▲ | HIGH AVAILABILITY DEPLOYMENT | SCHNENK PROCESS | $550,000 | 1/27/19 | PRESENTATION | TAKE DIFFERENTIATED ACTION TO POSITION THIS DEAL COMPETITIVELY |
| 70% | CLOUD COMPUTING DEPLOYMENT | GLOBAL TECHNOLOGIES | $80,000 | 10/18/18 | BUILDINGVISION | |
| 60% | UNIFIED COMMUNICATION EXPANSION | ECLARI INC | $975,000 | 11/21/18 | BUILDINGVISION | READ TOP NEWS ABOUT THIS ACCOUNT |
| 50% 618 | ELECTRONIC RECORD CONVERSION | HEAD STRONG ENGINEERING | $325,000 | 12/20/18 | DISCOVERY | CONSIDER WHETHER THIS DEAL SIZE IS ACHIEVABLE |
| 50% ▲ | GREEN DISASTER RECOVERY CENTER — YOUR ESTIMATED WIN PROBABILITY 50% PREDICTED WIN PROBABILITY↑ 84% | | 0 620 | 11/30/18 | DISCOVERY | UPDATE OPPORTUNITY STAGE AND WIN PROBABILITY VERIFY THIS OPPORTUNITY IS STILL VIABLE |
| 30% | MANUFACURING SOLUTIONS | TINDGE TECHNOLOGIES | $80,000 | 12/15/18 | QUALIFICATION | |
| 30% | BIG DATA ANALYTICS DEPLOYMENT | WEST BANK | $1,200,000 | 11/11/18 | QUALIFICATION | |
| 45% | DATA CENTER UPGRADE | PENYA BANK | $300,000 | 12/21/18 | DISCOVERY | |
| 70% | ENTERPRISE CRM IMPLEMENTATION | A. WOOD TURNING | $330,000 | 11/19/18 | BUILDINGVISION | |
| 50% | HOSTED SERVICES PLATFORM | IMAGE HOSPITALS | $40,000 | 11/11/18 | BUILDINGVISION | |
| 30% | | | | 12/17/18 | QUALIFICATION | |

MY OPEN OPPORTUNITIES... ▼
SHOW FILTERS ⋮ ACTIONS

| WIN % | NAME | ACCOUNT | AMOUNT | CLOSE DATE | SALES STAGE | RECOMMENDED ACTION(S) |
|---|---|---|---|---|---|---|
| 90% | INFRASTRUCTURE TRANSFORMATION | SYSTEM SOLUTIONS, INC. | $80,000 | 10/17/18 | QUOTEPROPOSAL | CALL THIS ACCOUNT TODAY REVIEW DECISION MAKER |
| 80% | SMARTER DC POWER SYSTEMS | NET-WORLD TECHNOLOGIES | $159,000 | 11/30/18 | INCONTRACT | |
| 75% | BIG DATA INITIATIVE | SIEMENS HEALTHINEERS | $150,000 | 1/15/19 | PRESENTATION | VERIFY THAT YOU HAVE CORRECT DECISION MAKER RESEARCH AND POSITION |
| 70% | HIGH AVAILABILITY DEPLOYMENT | | | | | |
| 70% | CLOUD COMPUTING DEPLOYMENT | | | | | |
| 60% | UNIFIED COMMUNICATION EXPANSION | | | | | |
| 50% | ELECTRONIC RECORD CONVERSION | HEAD STRONG ENGINEERING | $325,000 | 12/20/18 | DISCOVERY | CONSIDER WHETHER THIS DEAL SIZE IS ACHIEVABLE |
| 50% | GREEN DISASTER RECOVERY CENTER | HP SYSTEMS | $348,000 | 11/30/18 | DISCOVERY | UPDATE OPPORTUNITY STAGE AND WIN PROBABILITY |
| 30% | SOA INFRA CONVERSION | IBM SOFTWARES | $330,000 | 12/15/18 | QUALIFICATION | VERIFY THIS OPPORTUNITY IS STILL VIABLE |
| 30% | AUTOMATED MANUFACURING SOLUTIONS | PINNACLE TECHNOLOGIES | $80,000 | 11/11/18 | QUALIFICATION | |
| 45% | BIG DATA ANALYTICS DEPLOYMENT | WEST BANK | $1,200,000 | 12/21/18 | DISCOVERY | |
| 70% | DATA CENTER UPGRADE | PENYA BANK | $300,000 | 11/19/18 | BUILDINGVISION | |
| 50% | ENTERPRISE CRM IMPLEMENTATION | A. WOOD TURNING | $330,000 | 11/11/18 | BUILDINGVISION | |
| 30% | HOSTED SERVICES PLATFORM | IMAGE HOSPITALS | $40,000 | 12/17/18 | QUALIFICATION | |

Popup (622, 624, 626, 628):
REVIEW DECISION MAKER
HIGHER WIN% PREDICTED WHEN THE PRIMARY CONTACT IS AN IT DECISION MAKER
PRIMARY CONTACT   MARK BUTLER, HEAD OF PROCUREMENT
REVIEW OPPORTUNITY CONTACTS   NOT RELEVANT
GOOD SUGGESTION   < 2 OF 2 >
CANCEL

| MY OPEN OPPORTUNITIES... ▼ | | | | | | ☰ ACTIONS |
|---|---|---|---|---|---|---|
| SHOW FILTERS | | | | | | |
| WIN % | NAME | ACCOUNT | AMOUNT | CLOSE DATE | SALES STAGE | RECOMMENDED ACTION(S) |
| 90% △ | INFRASTRUCTURE TRANSFORMATION | SYSTEM SOLUTIONS, INC. | $80,000 | 10/17/18 | QUOTEPROPOSAL | CALL THIS ACOUNT TODAY REVIEW DECISION MAKER |
| 80% | SMARTER DC POWER SYSTEMS | NET-WORLD TECHNOLOGIES | $159,000 | 11/30/18 | INCONTRACT | |
| 75% | BIG DATA INITIATIVE | SIEMENS HEALTHINEERS | $150,000 | 1/15/19 | PRESENTATION | VERIFY THAT YOU HAVE CORRECT DECISION MAKER |
| | | 630 | | | | < 2 OF 2 |
| 70% △ | HIGH AVAILABILITY DEPLOYMENT | SCHNEN PROCES | ⬡ RESEARCH AND POSITION OUR BIG CLOUD OFFERING | | | |
| 70% | CLOUD COMPUTING DEPLOYMENT | GLOBAL TECHNOLO | NEW YORK CITY, NY - JUL 22,2018 - NET-WORLD ANNOUNCED ITS PLANS TO AQUIRE HLM MALTA FOR $75M TO SEEK AGGRESSIVE GROWTH AND CONSOLIDATE FRAGMENTED AREA OF THE INDUSTRY... MORE ⟵ 632 | | | |
| 60% | UNIFIED COMMUNICATION EXPANSION | ECLARI II | REVIEW PRODUCT CATALOG | | | |
| 50% | ELECTRONIC RECORD CONVERSION | HEAD STR ENGINEER | GOOD SUGGESTION    NOT RELEVANT ⟵ 636 | | | CANCEL |
| | | | 634 | | | |
| 50% △ | GREEN DISASTER RECOVERY CENTER | HP SYSTEMS | $348,000 | 11/30/18 | DISCOVERY | UPDATE OPPORTUNITY STAGE AND WIN PROBABILITY |
| 30% | SOA INFRA CONVERSION | IBM SOFTWARES | $330,000 | 12/15/18 | QUALIFICATION | VERIFY THIS OPPORTUNITY IS STILL VIABLE |
| 30% | AUTOMATED MANUFACURING SOLUTIONS | PINNACLE TECHNOLOGIES | $80,000 | 11/11/18 | QUALIFICATION | |
| 45% | BIG DATA ANALYTICS DEPLOYMENT | WEST BANK | $1,200,000 | 12/21/18 | DISCOVERY | |
| 70% | DATA CENTER UPGRADE | PENYA BANK | $300,000 | 11/19/18 | BUILDINGVISION | |
| 50% | ENTERPRISE CRM IMPLEMENTATION | A. WOOD TURNING | $330,000 | 11/11/18 | BUILDINGVISION | |
| 30% | HOSTED SERVICES PLATFORM | IMAGE HOSPITALS | $40,000 | 12/17/18 | QUALIFICATION | |

FIG. 6D

| MY OPEN OPPORTUNITIES... ▼ | | | | | | ☰ ACTIONS |
|---|---|---|---|---|---|---|
| SHOW FILTERS | | | | | | |
| WIN % | NAME | ACCOUNT | AMOUNT | CLOSE DATE | SALES STAGE | RECOMMENDED ACTION(S) |
| 90% △ | INFRASTRUCTURE TRANSFORMATION | SYSTEM SOLUTIONS, INC. | $80,000 | 10/17/18 | QUOTEPROPOSAL | CALL THIS ACOUNT TODAY REVIEW DECISION MAKER |
| 80% | SMARTER DC POWER SYSTEMS | NET-WORLD TECHNOLOGIES | $159,000 | 11/30/18 | INCONTRACT | |
| 75% | BIG DATA INITIATIVE | SIEMENS HEALTHINEERS | $150,000 | 1/15/19 | PRESENTATION | VERIFY THAT YOU HAVE CORRECT DECISION MAKER RESEARCH AND POSITION OUR BIG DATA CLOUD OFFERING |
| 70% △ | HIGH AVAILABILITY DEPLOYMENT | | VERIFY THIS OPPORTUNITY IS STILL VIABLE | | | 1 OF 1 |
| 70% | CLOUD COMPUTING DEPLOYMENT | | PAST OPPORTUNITIES LIKE THESE TYPICALLY CLOSE FASTER THAN THIS ONE | | | |
| 60% | UNIFIED COMMUNICATION EXPANSION | | # OF DAYS OPEN 125 | | | |
| 50% | ELECTRONIC RECORD CONVERSION | | REVIEW SUMMARY — 640 | | | |
| 50% △ | GREEN DISASTER RECOVERY CENTER | | GOOD SUGGESTION 642 NOT RELEVANT — 644 | | CANCEL | |
| 30% | SOA INFRA CONVERSION | IBM SOFTWARES | $330,000 | 12/15/18 | QUALIFICATION | VERIFY THIS OPPORTUNITY IS STILL VIABLE |
| 30% | AUTOMATED MANUFACURING SOLUTIONS | PINNACLE TECHNOLOGIES | $80,000 | 11/11/18 | QUALIFICATION | |
| 45% | BIG DATA ANALYTICS DEPLOYMENT | WEST BANK | $1,200,000 | 12/21/18 | DISCOVERY | |
| 70% | DATA CENTER UPGRADE | PENYA BANK | $300,000 | 11/19/18 | BUILDINGVISION | |
| 50% | ENTERPRISE CRM IMPLEMENTATION | A. WOOD TURNING | $330,000 | 11/11/18 | BUILDINGVISION | |
| 30% | HOSTED SERVICES PLATFORM | IMAGE HOSPITALS | $40,000 | 12/17/18 | QUALIFICATION | |

FIG. 6E

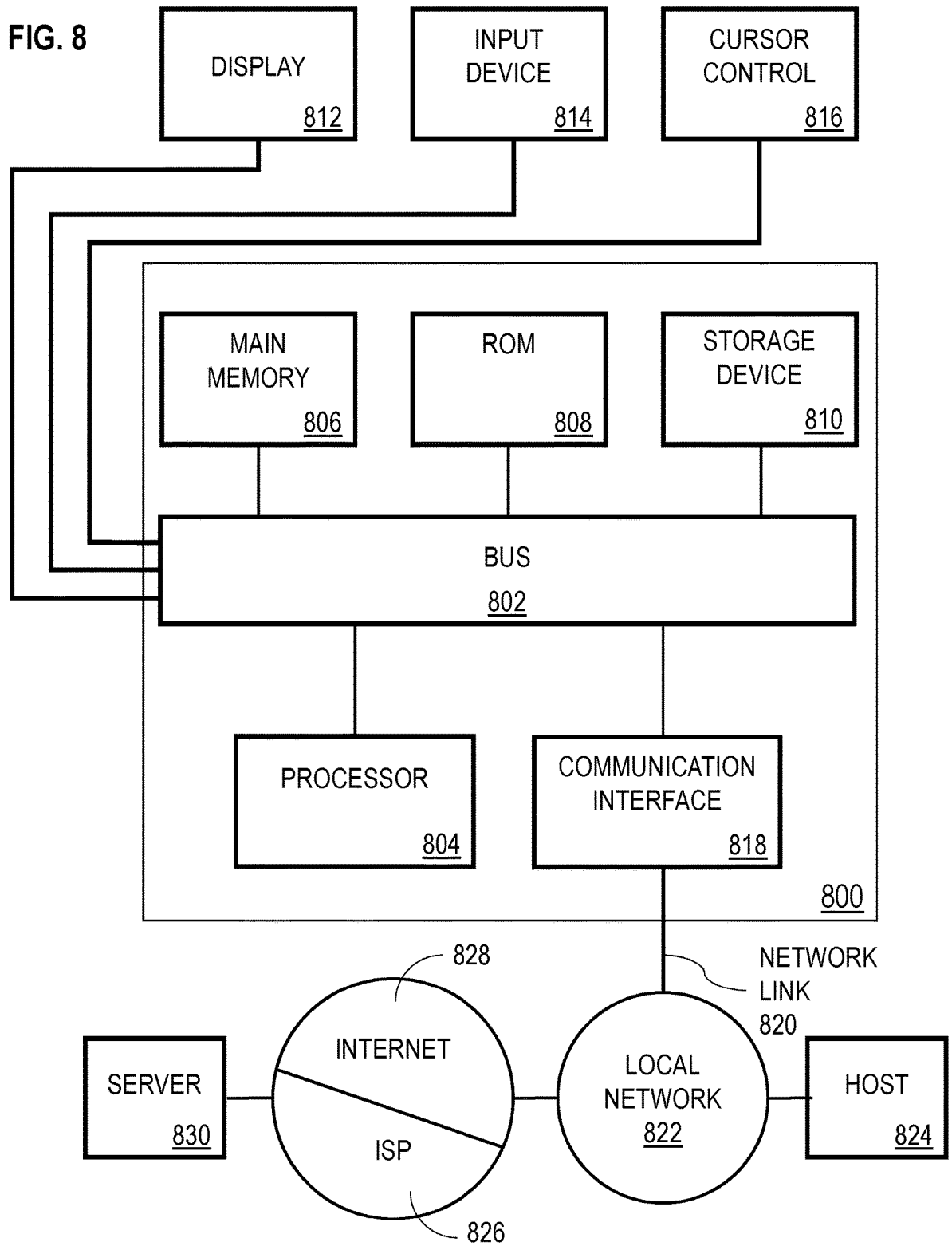

AUTOMATED ENHANCEMENT OF OPPORTUNITY INSIGHTS

TECHNICAL FIELD

The present disclosure relates to machine learning systems and applications. In particular, the present disclosure relates to using machine learning models for automatically enhancing insights about actionable opportunities to provide more efficient and effective outcomes.

BACKGROUND

Many software systems are designed to manage actionable opportunities and integrate responsive actions. For example, customer relationship management (CRM) systems may comprise a set of applications or components for managing opportunities to interact with and provide services to former, current, and future customers. The components may include a listener to identify actionable opportunities for interacting with customers, an analytic component for extracting information about the opportunity, and an interface to facilitate acting upon the opportunities. As another example, an enterprise system may be tailored for managing information technology infrastructure. The system may identify opportunities to upgrade, deploy, consolidate, patch, or otherwise reconfigure computing resources. Other enterprise systems may similarly identify and manage various types of opportunities to perform actions on or using a set of computing resources.

In large systems, the number of opportunities to execute actions may be difficult to process. For example, a CRM system may track hundreds of thousands of opportunities for interactions via social media or other platforms. It is often not an efficient or effective use of computing resources to respond to every opportunity. In some cases, it may not even be feasible to respond to every opportunity due to limited resources. Further, acting on an opportunity may yield little to no benefit or, in a worst-case scenario, may be damaging. Thus, targeting opportunities where the actions are most likely to be successful may help increase system scalability and provide more optimal outcomes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6A illustrates an example interface for viewing opportunities and associated insights in accordance with some embodiments;

FIG. 6B illustrates an example interface for viewing predicted win probabilities for an opportunity in accordance with some embodiments;

FIG. 6C illustrates an example interface for viewing and acting upon an opportunity insight, in accordance with some embodiments;

FIG. 6D illustrates another example interface for viewing and acting upon an opportunity insight, in accordance with some embodiments;

FIG. 6E illustrates another example interface for viewing and acting upon an opportunity insight, in accordance with some embodiments;

FIG. 8 shows a block diagram that illustrates a computer system in accordance with some embodiments.

DETAILED DESCRIPTION

Figure 1:
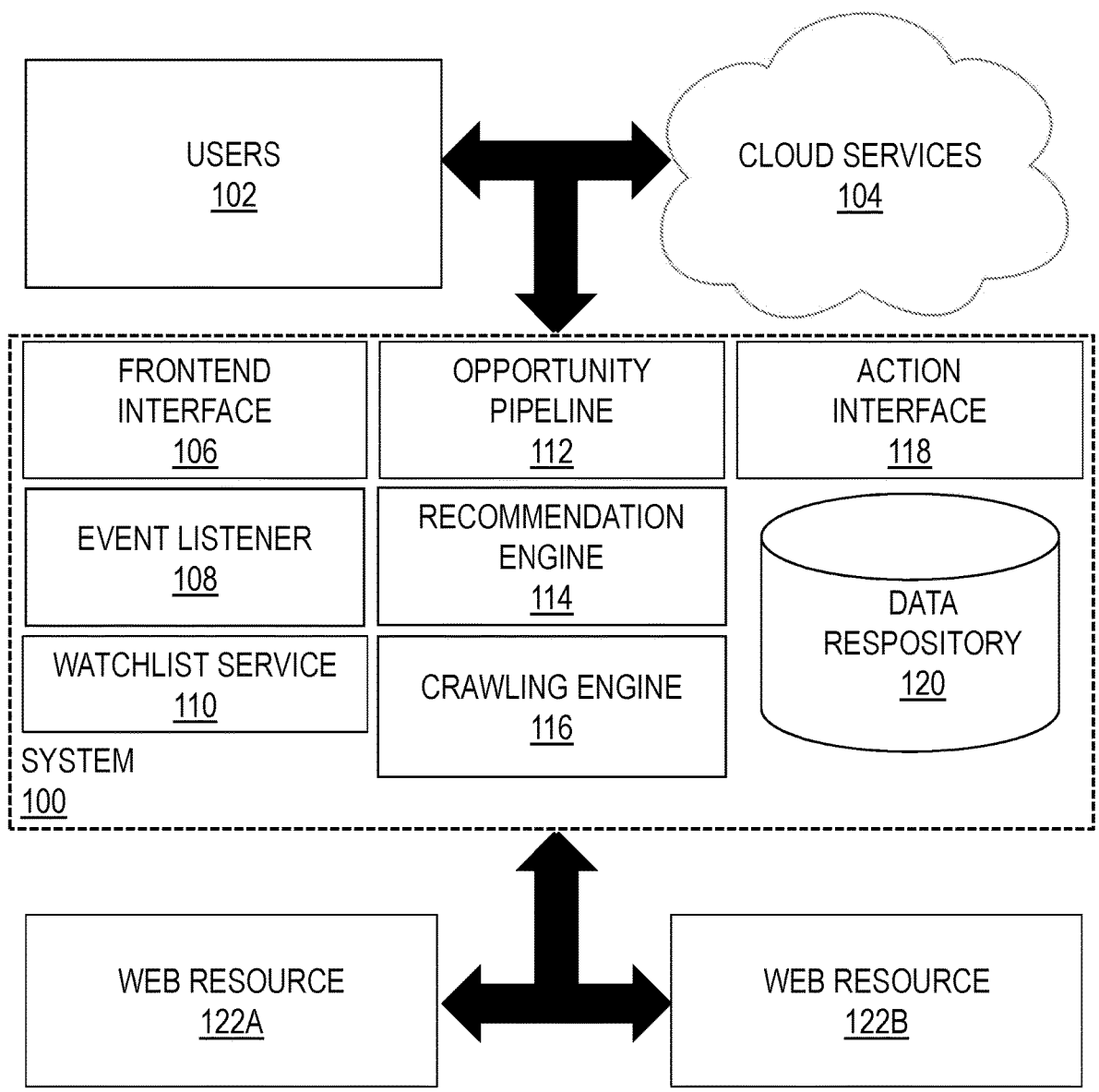
FIG. 1 illustrates a system for enhancing opportunity insights using machine learning in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1.0 General Overview
2.0 System Architecture
3.0 Real-Time Automated Opportunity Insights
   3.1 Opportunity Detection and Watchlists
   3.2 Opportunity Insights Through Machine Learning
   3.3 Model Tuning for Future Recommendations
4.0 Example Interfaces for Presenting and Interacting with Opportunity Insights
   4.1 Prioritization and Presentation of Opportunities
   4.2 Opportunity Insights Drill-Down and Feedback Interface
5.0 Computer Networks and Cloud Networks
6.0 Microservice Applications
7.0 Hardware Overview
8.0 Miscellaneous; Extensions

1.0 General Overview

Machine learning techniques for automatically enhancing insights into actionable opportunities are provided herein. The enhanced insights may serve to prioritize which actionable opportunities are pursued, allowing for more effective and efficient resource utilization. For example, computing resources may be directed to actionable opportunities having a high likelihood of success rather than actionable opportunities that yield little to no benefit. As a result, the techniques may mitigate ineffective resource usage, thereby increasing system scalability.

In some embodiments, a machine learning engine trains a model using historical examples of opportunities, actions, and resulting outcomes. The training process may automatically learn patterns in the historical examples that lead to successful and unsuccessful outcomes. The trained model may map the learned patterns to probabilities of the corresponding outcomes. For example, the trained model may map the likelihood that a particular electronic communication elicits a positive response by a recipient or that a particular patch fixes a problem on a computing resource. These insights may help guide or automatically trigger the actions that are taken with respect to new opportunities.

In some embodiments, the machine learning techniques include deploying an intelligent crawler to search external web resources for information about actionable opportunities. For example, the crawler may search a set of websites and/or other internet resources for current events that affect the probability of an outcome when a particular action is taken for a given opportunity. The crawler may continuously or periodically search the external web resources to identify events that may occur after an opportunity was first created or otherwise detected. The machine learning engine may use the information extracted by the crawler to train and/or tune the machine learning model. Thus, the machine learning model may account for how current events affect outcome probabilities for actionable opportunities.

The machine learning techniques allow for real-time insights into pending opportunities. When a crawler detects a current event that is relevant to a pending opportunity, an interface may present insights about the opportunity in real-time based on the output of the machine learning engine. For example, the machine learning engine may indicate whether the current event increases or decreases the likelihood of success for an action. With real-time insights, responses may be made in a timely manner. Additionally or alternatively, the output of the machine learning engine may be used to recommend, automatically trigger, and/or prevent actions based on such real-time, automated analytics.

The machine learning techniques described herein may be integrated into enterprise software systems and/or cloud services. For example, the system may be configured to recommend and/or trigger actions related to opportunities to publish social media posts, interact with customers, send targeted messages, and/or otherwise interact online. As another example, the system may be configured to recommend and/or trigger actions relating to patching, migrating, or otherwise reconfiguring computing resources. Additionally or alternatively, the system may be configured to enhance opportunity insights into other actions implemented on or by a computing resource.

One or more embodiments described in this Specification and/or recited in the claims may not be included in this General Overview section.

2.0 System Architecture

FIG. 1 illustrates system 100 for enhancing opportunity insights using machine learning in accordance with some embodiments. System 100 generally comprises frontend interface 106, event listener 108, watchlist service 110, opportunity pipeline 112, recommendation engine 114, crawling engine 116, action interface 118, and data repository 120. System 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Referring to FIG. 1, frontend interface 106 manages interactions between system 100 and users 102. For example, users 102 may submit requests to perform various functions and view results through frontend interface 106. A user in this context may be a human user, such as a system administrator, or another application, such as a shell or client application.

In some embodiments, frontend interface 106 is a presentation tier in a multitier application. Frontend interface 106 may translate results of various operations, described further herein, from other application tiers into a format that may be understood or processed by users 102. Frontend interface 106 may be configured to render user interface elements and receive input via user interface elements. For example, frontend interface 106 may generate webpages and/or other graphical user interface (GUI) objects. Client applications, such as web browsers, may access and render interactive displays in accordance with protocols of the internet protocol (IP) suite. Additionally or alternatively, frontend interface 106 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In some embodiments, opportunity pipeline 112 maintains a real-time view of actionable opportunities. Opportunity pipeline 112 may add new opportunities to a list, table, or other data structure to track. Opportunity pipeline 112 may remove opportunities with an inactive or completed status. An opportunity may become inactive when a threshold amount of time has lapsed and no action has been taken. Additionally or alternatively, an opportunity may become inactive if system 100 otherwise receives an indication that no action will be taken. An opportunity may be complete if system 100 has executed an action corresponding to the opportunity.

An opportunity stored by opportunity pipeline 112 may correspond to an event that potentially warrants a responsive action using a set of one or more computing resources. For example, an opportunity may present a chance to respond to a social media post, render a targeted message in a web browser, send a targeted email message, or otherwise interact online with internet users. As another example, an opportunity may present a chance to patch, migrate, deploy, shutdown, restart, or otherwise reconfigure computing resources in a datacenter or cloud environment. The actions may be executed to enhance cloud services, address detected problems and/or satisfy anticipated demands on the computing resources. Additionally or alternatively, opportunity pipeline 112 may track opportunities to perform other responsive actions, depending on the particular implementation.

In some embodiments, event listener 108 corresponds to a function, such as a callback routine, interface, process and/or other component for handling newly detected opportunities. Event listener 108 may also listen for updates to pending opportunities. If an event is detected, event listener 108 may query data repository 120 to determine whether a watchlist for the opportunity exists. As described further herein, a watchlist is a data object that controls the search for current events relevant to the opportunity.

In some embodiments, watchlist service 110 is configured to generate watchlists for new and/or updated opportunities. A watchlist may define or otherwise identify a set of search criteria for finding information relevant to an opportunity. Techniques for generating watchlists are described further below in Section 3.1, titled "Opportunity Detection and Watchlists".

In some embodiments, crawling engine 116 includes a web crawler configured to crawl external web resources, such as web resource 122a and 122b, for information matching search criteria defined in opportunity watchlists. The web crawler may be an internet bot tailored to search a specific set of resources, such as websites that are trusted to contain reliable information. The web crawler may crawl the web resources on a continuous or periodic basis.

Additionally or alternatively, crawling engine 116 may include one or more classifiers for classifying information extracted from external web resources. In some embodiments, crawling engine 116 includes a sentiment analyzer to computationally identify, quantify, and/or categorize the sentiment of content contained within a web resource. For instance, the sentiment analyzer may be configured to classify a news article as having positive sentiments, negative sentiments, or neutral sentiments.

Additionally or alternatively, crawling engine 116 may include other classifiers to categorize web resources as a function of sentiment and/or non-sentiment analytics. The classifiers may generate tags to label and classify the web resources. For example, a classifier may generate a tag that summarizes or otherwise identifies what type of current event was detected in a web resource matching search criteria in a watchlist. The tags that are generated may vary from implementation to implementation. Additional examples are provided in the sections below.

In some embodiments, crawling engine 116 trains classifiers through machine learning. For example, crawling engine 116 may receive a set of example websites and corresponding labels that classify the content as positive, negative, or neutral. Crawling engine 116 may use the labeled examples to train a machine learning model, such as a support vector machine, a bag of words model, or an artificial neural network. Crawling engine 116 may use the trained classifier models to classify unlabeled web resources. In other embodiments, crawling engine 116 may classify the web resource using pre-defined rules. For instance, crawling engine 116 may classify sentiment information through natural language processing based on the presence of certain words, phrases, and/or grammatical relationships.

In some embodiments, web resources 122a and 122b include content that are accessible via one or more data communication networks, such as the internet. Web resources 122a and 122b may be identified using uniform resource identifiers (URIs) including uniform resource locators (URLs). As previously indicated, web resources 122a and 122b may be external to system 100. An external resource in this context refers to a resource at a remote network location that is managed independently of system 100. For example, web resources 122a and 122b may reside on remote servers that are independently maintained and operated. In other embodiments, one or more of web resources 122a and 122b may be managed directly by system 100.

In some embodiments, recommendation engine 114 is configured to recommend actions for pending opportunities. Recommendation engine 114 may factor in information extracted from crawling engine 116 to provide recommendations. For example, recommendation engine 114 may recommend actions as a function of sentiment information and/or non-sentiment information extracted from current events that are relevant to opportunities stored by opportunity pipeline 112. Recommendation engine 114 may update recommendations in real-time as crawling engine 116 discovers new events.

In some embodiments, recommendation engine 114 includes a machine learning engine for automatically learning patterns of actions resulting in successful outcomes. The machine learning engine may select features for training a machine learning model. The features may include variables or other attributes extracted from external web resources. For example, the features may include sentiment information and/or attributes extracted from a news website that are relevant to an opportunity. Recommendation engine 114 may use a trained model to predict the probability of certain outcomes if a particular action is taken for an opportunity. Techniques for training models and evaluating opportunities are described further below in Section 3.2, titled "Opportunity Insights Through Machine Learning".

In some embodiments, action interface 118 provides an interface for executing actions using computing resources. Action interface 118 may include an API, CLI, or other interface for invoking functions to execute actions. One or more of these functions may be provided through cloud services or other applications, which may be external to system 100. For example, one or more components of system 100 may invoke an API of an email client application to transmit a targeted email message. As another example, an API of a publishing tool may be invoked to trigger a targeted social media post to one or more social media platforms. In yet another example, system 100 may submit commands to reconfigure software and/or hardware resources. Thus, the actions that are performed may vary from implementation to implementation.

In some embodiments, actions may be automatically triggered based on recommendations from recommendation engine. For instance, a recommendation to perform an action for an opportunity based on a recent current event may trigger the action to be executed via action interface 118, which may include invoking an appropriate API for performing a target function. As another example, an action may be triggered automatically if and only if the predicted likelihood of success, as quantified by a probability score, exceeds a threshold. Additionally or alternatively, actions may be triggered responsive to user requests received through frontend interface 106.

In some embodiments, cloud services 104 are network services that are external to system 100. Example cloud services may include, but are not limited to, social media platforms, email services, short messaging services, enterprise management systems, and other cloud applications. Action interface 118 may serve as an API endpoint for invoking a cloud service. For example, action interface 118 may generate outbound requests that conform to protocols ingestible by cloud services 104. Action interface 118 may process and translate inbound requests to allow for further processing by other components of system 100. Action interface 118 may store, negotiate, and/or otherwise manage authentication information for accessing cloud services 104. Example authentication information may include, but is not limited to, digital certificates, cryptographic keys, usernames, and passwords. Action interface 118 may include authentication information in the requests to invoke functions provided through cloud services 104.

In some embodiments, data repository 120 stores data generated and/or otherwise accessed by components of system 100. Example data may include, but is not limited to, trained machine learning models, opportunity attributes, event information, watchlists, GUI data, and crawling results. Data repository 120 may be any type of storage unit and/or device (e.g., a file system, database, collection of tables, or any other storage mechanism) for storing data. Further, data repository 120 may include multiple different storage units and/or devices. The multiple different storage units and/or devices may or may not be of the same type or located at the same physical site. Further, data repository 120 may be implemented or may execute on the same computing system as one or more other components of system 100. Alternatively or additionally, data repository 120 may be implemented or executed on a computing system separate from one or more other components of system 100. Data repository 120 may be communicatively coupled to one or more components illustrated in system 100 via a direct connection or via a network.

In some embodiments, system 100 is a cloud service, such as a software-as-a-service (SaaS) or a web service. Users 102 may access cloud services using a client, such as a web browser, mobile application, or other software application communicatively coupled to a network. The client may interact with cloud services using one or more communication protocols, such as HTTP and/or other communication protocols of the Internet Protocol (IP) suite. In other embodiments, system 100 may be locally accessible to a user, such as a desktop or other standalone application.

Additional embodiments and/or examples relating to computer networks and microservice applications are described below in Section 5.0, titled "Computer Networks and Cloud Networks" and Section 6.0, titled "Microservice Applications".

3.0 Real-Time Automated Opportunity Insights

3.1 Opportunity Detection and Watchlists

In some embodiments, opportunity pipeline 112 maintains real-time information on pending opportunities. Opportunities may transition through different states in an opportunity lifecycle. For example, new opportunities may begin in an active status and identify one or more actions that are available for execution. If system 100 executes an available activity, then the opportunity may transition to a new stage of execution. For instance, a sales opportunity may begin with system 100 sending an initial contact message, followed by scheduling a presentation, presenting the presentation, sending a quote proposal, generating a contract, etc. As another example, a customer support opportunity may begin with a query about a problem with a resource, followed by a patch to correct the problem, followed by a follow-up inquiry to determine whether the problem was solved. Thus, the stages of execution may vary from one implementation to the next.

Opportunities may transition to a complete status after passing through all stages of execution or when there are otherwise no further actions to perform. System 100 may classify outcome of an action as successful or unsuccessful. Whether an outcome is successful may vary depending on the particular type of opportunity. In the preceding sales example, the outcome may be classified as successful if the actions result in the sale being closed with a target entity. In the customer support scenario, the outcome may be classified as successful if the patch successfully corrected a problem. As another example, a social media post may be classified as successful if the post generates a threshold amount of engagement reflecting a positive sentiment. The outcome of an action taken for a given opportunity may serve as feedback for training a machine learning model, as described further herein.

Opportunities may transition to an inactive status if no actions have been executed within a threshold period of time, responsive to a request from a user, and/or responsive to other triggering events. In some embodiments, system 100 may transition opportunities to an inactive status responsive to detecting a current event indicative that the opportunity is no longer viable. For example, if a company is acquired, then all pending opportunities directed to the company may be reclassified as inactive.

Opportunity pipeline 112 may add and/or delete opportunities on demand and/or in response to detected events. In some embodiments, opportunities are generated by users 102 via frontend interface 106. Users may input, via a GUI or other interface, information about the opportunity. Example information may include lead information identifying how an opportunity arose, a date when the opportunity first arose, entity information identifying the target of the opportunity such as a customer account or a computing resource, recommended actions for the opportunity, and/or contact information for interacting with a target entity. When a user submits the information, a new entry may be added to a table, list, and/or other data structure maintained by opportunity pipeline 112.

Additionally or alternatively, system 100 may be configured to automatically detect opportunities. In some embodiments, system 100 includes a social listening component that monitors posts on social media channels, such as Facebook, Twitter, LinkedIn, SnapChat, Periscope, Yelp, WeChat, FourSquare, Instagram, Pinterest, Tumblr, WhatsApp, WordPress, etc. Posts may present an opportunity to respond in order to enhance service, improve communications, and/or provide relevant content. For example, a social listening component may search for posts that express a negative sentiment about a certain product to resolve any potential problems. If a post satisfies the set of criteria, then opportunity pipeline 112 may add a corresponding opportunity to allow appropriate responsive actions to be considered.

Current events may affect pending opportunities in a variety of ways. If company A acquires company B, for instance, future communications with the company B are likely to yield little benefit and may not even been possible. However, the acquisition may increase or decrease the likelihood of success for certain actionable opportunities directed at company A. For example, if company B creates a competing product, then targeting sales opportunities to company A may be hurt. On the other hand, if company B was a previous customer, then similar sales opportunities directed to company A may have a greater likelihood of success. As another example, support websites may include feedback on whether particular solutions to technical problems successfully solved a problem or not. System 100 may leverage this information to recommend similar or different solutions to pending opportunities.

In some embodiments, watchlist service 110 generates watchlists for pending opportunities to provide real-time monitoring for relevant current events. The watchlists may control what content crawling engine 116 searches for and how crawling engine 116 executes the search. For example, a watchlist may specify search criteria such as words, phrases, metadata, and/or attributes to direct a web crawler's search. The search criteria may specify the conditions under which a match is found. In some cases, a website including a single word or phrase on a watchlist may be a match. In other cases, a match may be found only when a threshold number of words or phrases are found. Other conditions may also be specified, depending on the particular implementation. Additionally or alternatively, the search criteria may specify the websites or other web resources to search for matching content.

Figure 2:
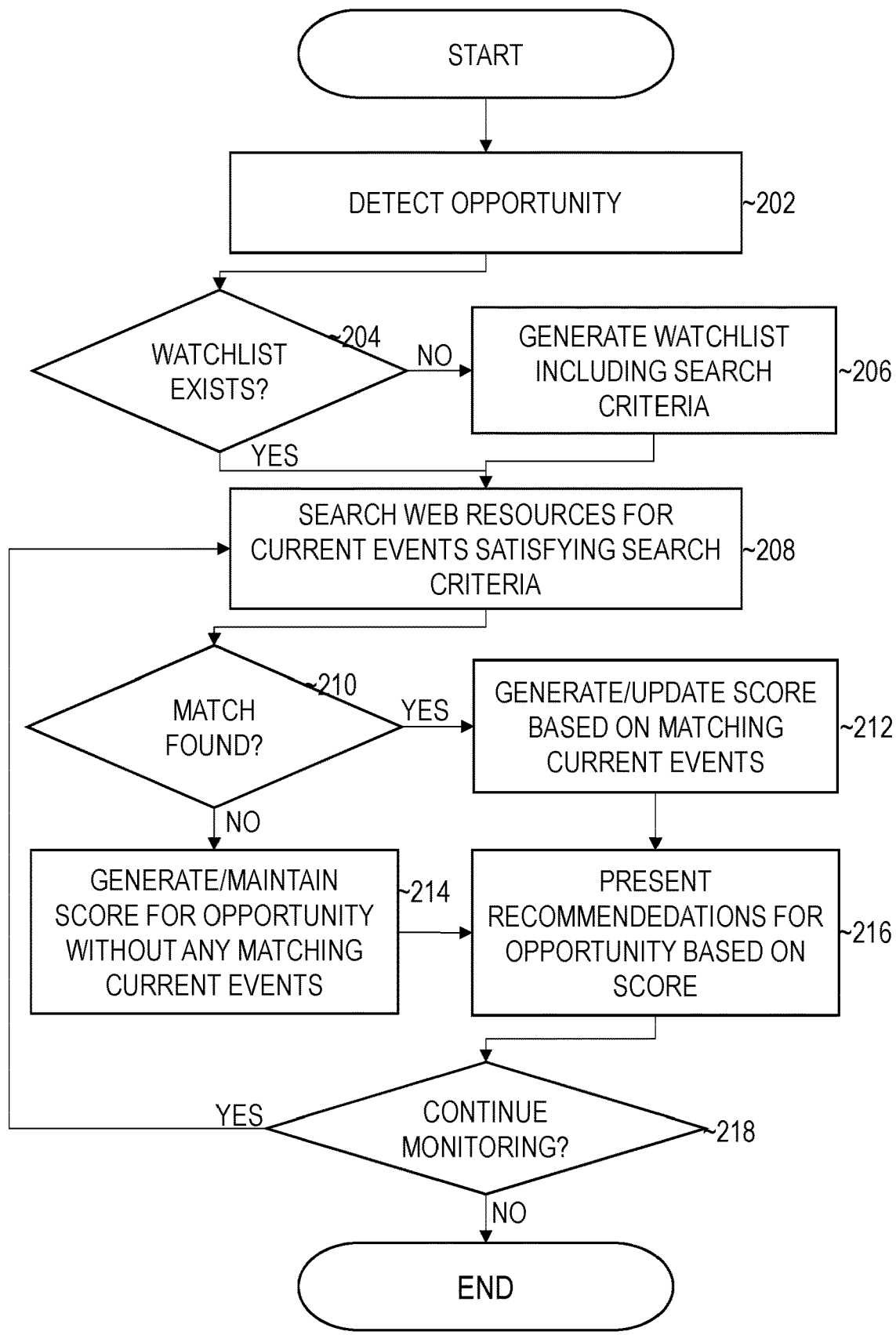
FIG. 2 illustrates an example set of operations for performing recommendations for opportunities based on related current events in accordance with some embodiments.

FIG. 2 illustrates an example set of operations for performing recommendations for opportunities based on related current events in accordance with some embodiments. One or more operations illustrated in FIG. 2 may be modified, rearranged, or omitted. Accordingly, the particular sequence of operations illustrated in FIG. 2 should not be construed as limiting the scope of one or more embodiments.

Referring to FIG. 2, event listener 108 detects a new opportunity (operation 202). As previously indicated, an opportunity may be created by a user or automatically detected, depending on the implementation. When opportunity pipeline 112 adds a new opportunity, an event notification may be triggered to alert event listener 108.

Responsive to detecting an opportunity, event listener 108 determines whether a watchlist for the opportunity already exists (operation 204). For example, the table below includes pseudocode on how an event may be detected and a watchlist updated for new opportunities.

TABLE 1

PSEUDOCODE FOR UPDATING WATCHLISTS

```
EventListener(target:Object, opportunity:Object){
    standardizeTargetName(target)
    standardizeOpportunityName(opportunity)
    Found = lookupWatchList(target, opportunity)
    If found
        Exit
    If not found
        create WatchList(target, opportunity)
    }
}
```

In the pseudocode above, the input object target may include a name or other identifier for a target against which the opportunity is directed. For example, the object target may identify an entity, account, or target resource. The object opportunity may include a name or other identifier for the opportunity. The pseudocode standardizes the target and opportunity name to account for potential differences, which may be based on known or learned patterns. For instance, an acronym may sometimes be used in place of the full name for an entity. The standardization process may expand the acronym out to the full name or compact the full name to the acronym to facilitate matching.

If a match is not found then a new watchlist is not generated. Otherwise, watchlist service 110 generates a new watchlist (operation 206). In some embodiments, the watchlist includes search criteria based on the input target and opportunity objects. For example, watchlist service 110 may add the name of a target entity, the stock ticker symbol, acronyms, and/or other identifiers. Additionally or alternatively, the search criteria may include terms relevant to the type of opportunity for which the watchlist is being created. For instance, the search criteria may identify the current stage of the opportunity and the type of responsive actions that are available for the opportunity. Watchlist service 110 may define search conditions based on predefined rules and/or through machine learning processes. In other embodiments, a user may add or adjust the search criteria in a watchlist.

Crawling engine 116 next searches web resources for current events satisfying the search criteria (operation 208). For example, crawling engine 116 may search for news webpages storing content that matches the search terms and/or other search criteria defined in a watchlist. The crawling engine 116 may search trusted news websites to limit the scale of the search. These websites may be predefined and used across multiple watchlists or specified on a per watchlist basis.

Crawling engine 116 next determines whether a matching current event has been found (operation 210). For example, a match for a sales opportunity may be detected if a target entity has expanded into more regions, received an award, lost value in a stock market, or otherwise experienced an event reflective of a target entity's status. As another example, a match for an opportunity to post a social media message may be detected if a target entity won a game, received an award, accepted a new job position, or otherwise experienced a change in status. In yet another example, a match for an opportunity to address performance degradation in a computing resource may be detected if reports of widespread problems are detected, a new patch is released, or other similar events are detected.

In some embodiments, recommendation engine 114 generates a score based on one or more matching events (operation 212). The score may represent a likelihood of success for an action if pursued for the corresponding opportunity. The score may factor in various features of the current event. Example features include, but are not limited to, the sentiment of the event, the category of the event, and/or the magnitude of the event. For example, a relatively low score may be generated for a sales opportunity to a company that suffered a large stock market loss in comparison to the score for a large stock market gain. A slight change may be neutral. Recommendation engine 114 may generate the score using a machine learning model, as described further below.

In some embodiments, recommendation engine 114 may still generate a score if no matching events are found (operation 214). Recommendation engine 114 may factor in features outside the context of current events to generate the score. For example, a sales opportunity might vary depending on the product, the lead, the contact, and/or other opportunity attributes.

Once a score has been generated, recommendation engine 114 presents or otherwise outputs a recommendation for the opportunity based on the score, in accordance with some embodiments (operation 216). For example, recommendation engine 114 may recommend pursuing a particular action if the likelihood of success exceeds a threshold and skipping the particular action if below the threshold. Thus, resources may be deployed to opportunities where successful results are most likely to be achieved. The reduced overhead may increase resource efficiency and improve scalability, allowing for a greater number of opportunities to be successfully pursued within a given timeframe.

For a given watchlist, system 100 may determine whether to continue searching for content (operation 218). As previously noted, crawling engine 116 may search on a continuous or periodic basis. If an opportunity transitions to an inactive or complete state, then the watchlist for the opportunity may also become inactive or be deleted. As a result, crawling engine 116 may cease searching external web resources for the opportunity.

3.2 Opportunity Insights Through Machine Learning

In some embodiments, recommendation engine 114 leverages machine learning to enhance insights into opportunities. Machine learning allows recommendation engine 114 to identify patterns and perform decisions that may not be readily apparent or known a priori. Thus, patterns may be learned without being hard coded into system 100. Further, machine learning allows recommendation engine 114 to accommodate changes to patterns, which may evolve over time.

In some embodiments, machine learning includes a training phase and an evaluation phase. During the training phase, recommendation engine 114 includes a machine learning engine that builds a model as a function of historical examples of opportunities, actions, and resulting outcomes. As previously mentioned, the training process may automatically learn patterns in the historical examples that lead to successful and unsuccessful outcomes. The trained model may map the learned patterns to probabilities of the corresponding outcomes. For example, the trained model may learn what patterns associated with opportunities to send electronic communication are most likely to elicit positive responses by recipients. As another example, the trained model may learn what patterns are most likely to lead to successfully correcting performance degradation in a software resource.

Figure 3:
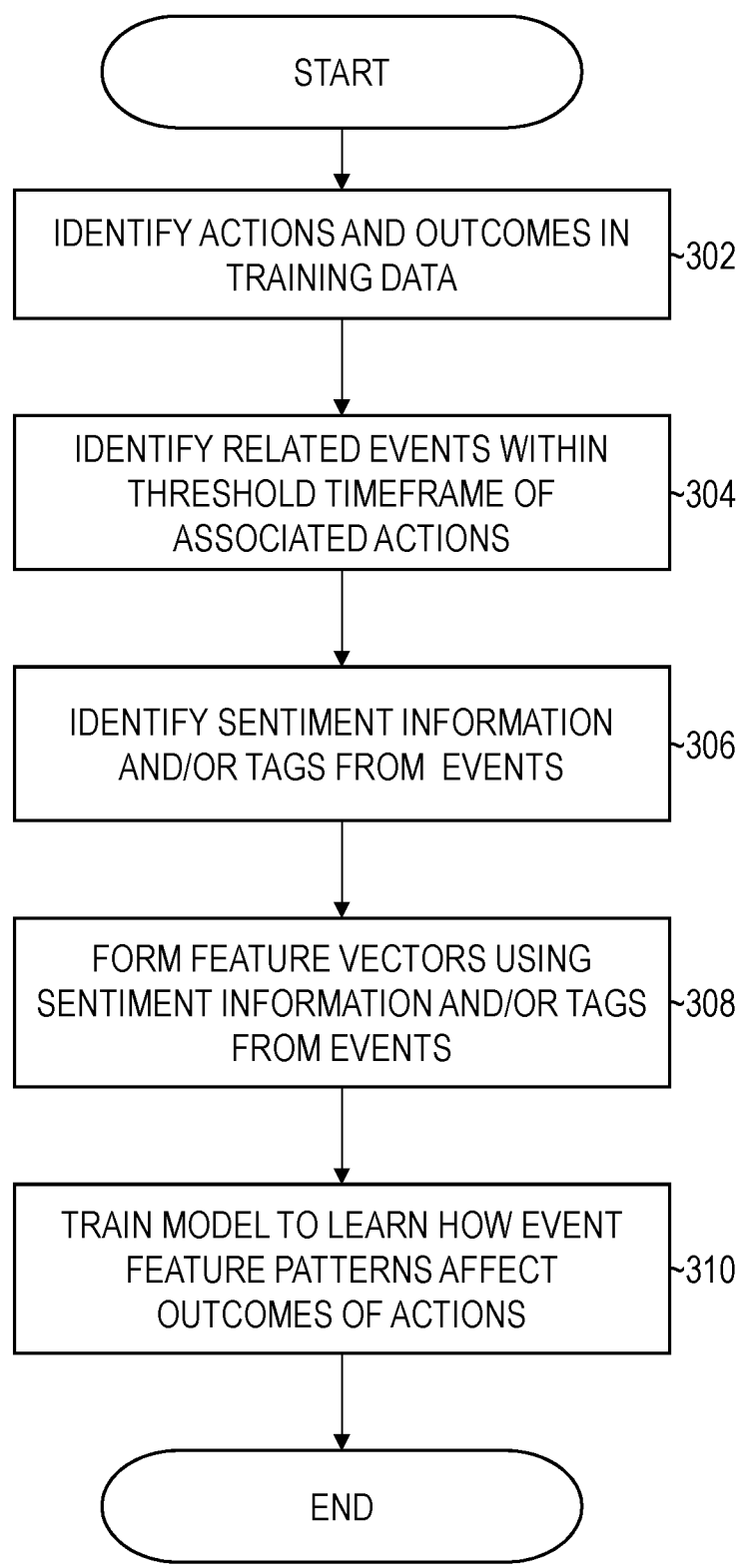
FIG. 3 illustrates an example set of operations for building a machine learning model to provide opportunity insights in accordance with some embodiments.

FIG. 3 illustrates an example set of operations for building a machine learning model to provide opportunity insights in accordance with some embodiments. One or more operations illustrated in FIG. 3 may be modified, rearranged, or omitted. Accordingly, the particular sequence of operations illustrated in FIG. 3 should not be construed as limiting the scope of one or more embodiments.

The training process includes identifying a set of actions and outcomes in training data (operation 302). For example, the training process may identify whether or not a particular communication led to a sale being closed, a positive customer service experience, or some other outcome. In some embodiments, a user may label the outcomes of the training data as successful or unsuccessful. Additionally or alternatively, recommendation engine 114 may automatically infer the outcome and label the training data based on the results caused by particular actions.

The training process further includes identifying related events within a threshold timeframe of the associated actions (operation 304). The events may include news articles or other information that occurred after an opportunity was first created. The events may added by a user in a supervised training process or may be automatically found by crawling engine 116 in an unsupervised approach. For example, crawling engine 116 may search for news articles that were published online while the opportunity was still active or in some other timeframe relative to the opportunity.

The training process includes identifying sentiment information and/or tags from the events relative to opportunities in the training dataset (operation 306). As previously described, a sentiment analyzer may use natural language processing and/or trained classifiers to classify the sentiment of an event. For example, a news article about a sudden drop in stock price may be classified as negative whereas a large gain may be classified as positive. As another example, a news article critical of a certain target may be classified as negative whereas news of the target receiving an award may be classified as positive. Tags may further categorize the event. In the preceding examples, for instance, a current event may be classified as a stock market event, a customer review event, an award event, etc. The classifications may vary from implementation to implementation.

The training process next forms feature vectors using the sentiment information and/or the tags from the event (operation 308). The training process may use one-hot encoding or multi-hot encoding to transform raw data into a format that is usable in a feature vector. One-hot encoding represents a feature value by creating a Boolean variable for different feature values in the training dataset. For example, one-hot encoding may create mappings of tags categorizing an event type to encoding values as follows:

Map new customer deal to 0000
Map stock market event to 0001
Map new marketing effort to 0010
Map region expansion to 0100
Map everything else to 1000

As another example, one-hot encoding may create mappings of sentiment information as follows:

Map neutral sentiment to 00
Map positive sentiment to 01
Map negative sentiment to 10

A feature vector for the two features may be formed by combining encoding. For example, a feature vector following the format [event type, sentiment] for a positive stock market event may be formed as follows [0001 01]. Instead of using one hot encoding, per the above, for the sentiment feature, negative sentiment may instead be represented as "4", neutral sentiment as "0" and positive sentiment as "1". Other encodings may also be used, depending on the particular implementation.

In the above example, the training process formed a feature vector from sentiment and non-sentiment information extracted from the found events. Additionally or alternatively, the training process may select other features associated with an opportunity, action performed, the related events found, and/or the outcome to form the feature vector. For a sales pipeline, examples include, but are not limited, how much time lapsed between the opportunity and an outcome, who the recipient for an electronic message was, what communication channel was used to send the electronic message, whether previous communications with an entity were successful or not, and how much money is at stake in a sales opportunity. For a service request pipeline, examples include, but are not limited to, what customer feedback was received, how much time lapsed between the opportunity and an outcome, what patches were previously applied to a resource, and what type of resource is experiencing problems. Thus, features that are selected may vary from implementation to implementation.

The process next trains a model using the feature vectors to learn how event feature patterns affect outcomes of actions (operation 310). In some embodiments, the feature vectors are used to train a probabilistic support vector machine (SVM). When trained, an SVM defines a set of one or more support vectors, also referred to as hyperplanes. A probabilistic SVM gives probabilities that the classification is correct. One approach is to use Platt Scaling to compute probabilities, although other methods, such as Bayes method, may also be used. For a given feature vector, a probabilistic SVM may give a probability that is was correctly predicted as resulting in a successful outcome or an unsuccessful outcome. In addition or as an alternative to SVMs, other probabilistic classifier models may be trained depending on the particular implementation. Examples may include, but are not limited to, multilayer perceptrons of an artificial neural network classifiers, naive Bayes classifiers, fuzzy clustering models (e.g., soft k-means clustering), and logistic regression.

Figure 4:
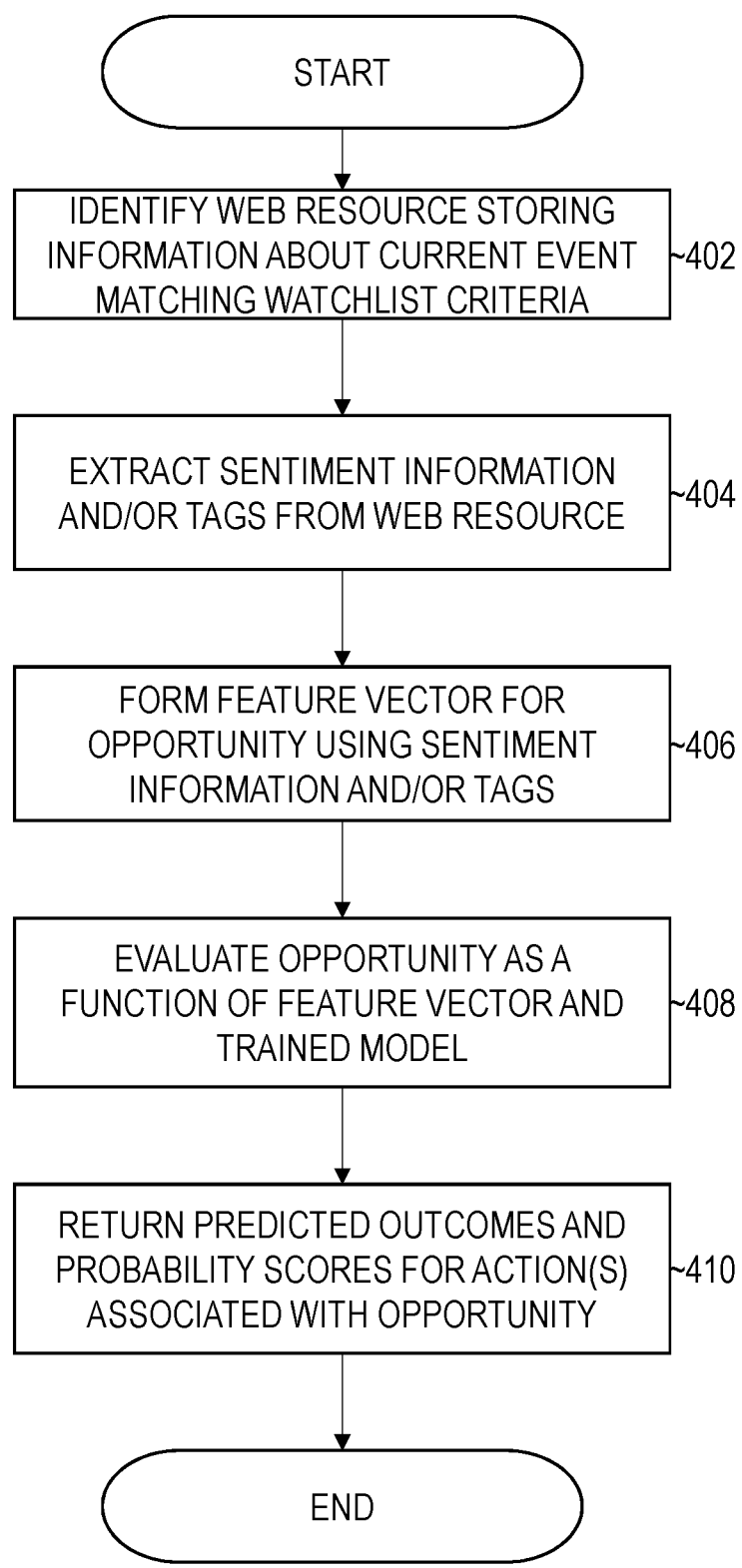
FIG. 4 illustrates an example set of operations for evaluating opportunities using a machine learning model in accordance with some embodiments.

During the evaluation phase, recommendation engine 114 may use the trained model to score and recommend actions for pending opportunities. FIG. 4 illustrates an example set of operations for evaluating opportunities using a machine learning model in accordance with some embodiments. One or more operations illustrated in FIG. 4 may be modified, rearranged, or omitted. Accordingly, the particular sequence of operations illustrated in FIG. 4 should not be construed as limiting the scope of one or more embodiments.

The evaluation process includes identifying a web resource storing information about a current event matching watchlist criteria for an opportunity (operation 402). For example, crawling engine 116 may identify news articles from websites that describe events relevant to a company or other entity that is the target of an opportunity.

Crawling engine 116 next extracts sentiment information and/or tags (operation 404). For example, this information may be extracted in a similar manner to the training dataset described above. The table below includes example pseudocode that illustrates how crawling engine 116 may tag and return data to recommendation engine 114.

TABLE 2

PSEUDOCODE FOR EXTRACTING INFORMATION FROM WEB RESOURCE

```
CrawlerEnginer( ){
    CreateBlankDictionary( )
    List newsfeed = Asynchronous crawlWeb(targetName)
    For each news in the newsfeed
        sentiments = runSentimentAnalysis(news)
        tags = extractTags(news)
        updateDictionary(opportunity, target, sentiments, tags)
    return dictionary
}
```

In the pseudocode above, the function CreateBlankDictionary( ) generates an object data structure for storing the extracted information, runSentimentAnlaysis(news) extracts sentiment information from the web resources news, extractTags(news) extracts non-sentiment tags, and updateDictionary(opportunity, target, sentiments, tags) stores the extracted feature values in the dictionary data structure. The dictionary may then be returned or otherwise passed to recommendation engine 114.

The evaluation process next forms feature vectors for the opportunity using the sentiment information and/or the tags extracted from the web resource (operation 406). As with the training process, the feature vectors may include other feature values associated with the opportunity, such as how much time has lapsed since the opportunity was detected, etc. The feature vector for the new opportunity may be formed in the same manner as those for the training dataset.

The evaluation process next evaluates the opportunity as a function of the feature vector and the trained model (operation 408). In some embodiments, a trained probabilistic classification model, such as a probabilistic SVM, receives as input the feature vector for the new opportunity and outputs a classification including a probability that the classification is correct. The classification may correspond to a prediction, for the opportunity, that a particular action will or will not be successful. The probability may correspond to the likelihood that the prediction is accurate. For example, the trained model may be used to predict that a targeted message will result in positive engagement with a 75% probability score. As another example, the trained model may be used to predict that a particular patch will correct performance degradation with an 90% probability score. The predictions are made based on learned feature patterns from the training dataset.

In some embodiments, multiple actions may be evaluated for a single opportunity. For example, one action might involve sending a message to contact A and another sending the same message to contact B. In this example, separate feature vectors may be formed for each action, where one of the features includes the contact. The classifications and/or probability scores might be the same or different, depending on the learned patterns from the training dataset.

Referring again to FIG. 4, the evaluation process next returns the predicted probability of the action outcome for the probability (operation 410). In some embodiments, the recommendations are used to trigger automated actions. For example, a patch may automatically be applied or a message automatically posted if the likelihood of success, as indicated by the probability score, satisfies a threshold. If the threshold is not satisfied, then further review may be required before the action is triggered or execution of the action may be prevented.

Additionally or alternatively, the output of the evaluation process may be used to sort, filter, prioritize, and/or otherwise present insights into opportunities. Example interfaces are described further below in Section 4.0, titled "Example Interface for Presenting and Interacting with Opportunity Insights".

3.3. Model Tuning for Future Recommendations

In some embodiments, recommendation engine 114 tunes the machine learning model based on feedback. Feedback include any interactions that are indicative of how predictive feature values are of a particular outcome. Feedback may be received for individual feature values, groups of feature values, or for an entire feature vector. Recommendation engine 114 may retrain or otherwise tune the machine learning model to account for the feedback.

Figure 5:
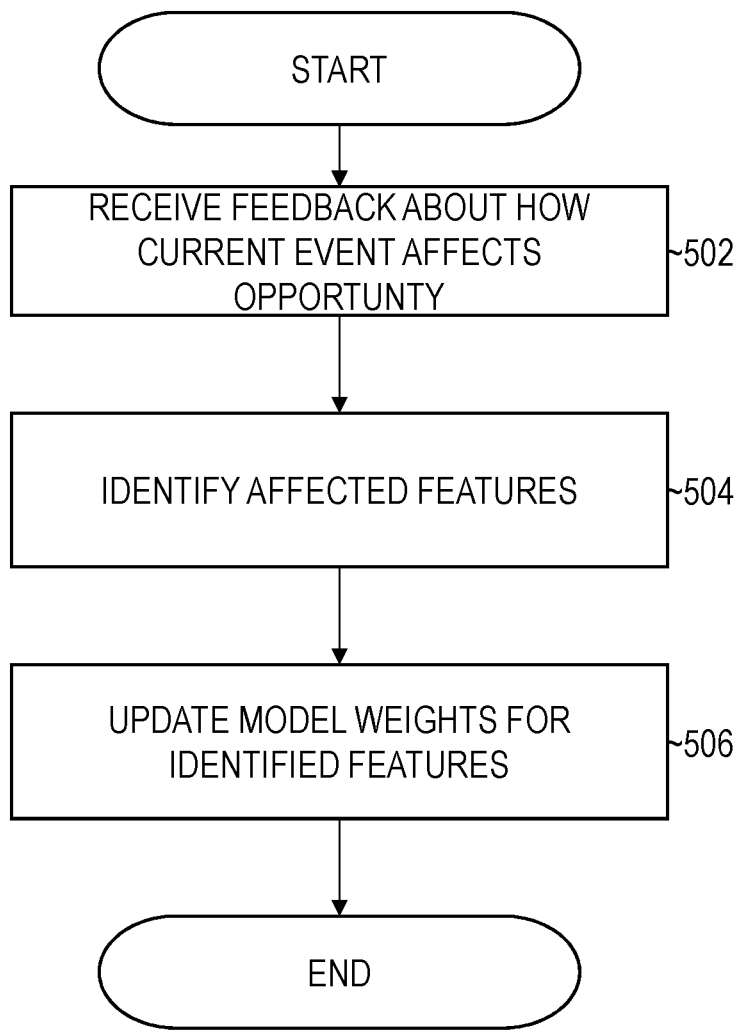
FIG. 5 illustrates an example set of operations for tuning a machine learning model in accordance with some embodiments.

FIG. 5 illustrates an example set of operations for tuning a machine learning model in accordance with some embodiments. One or more operations illustrated in FIG. 5 may be modified, rearranged, or omitted. Accordingly, the particular sequence of operations illustrated in FIG. 5 should not be construed as limiting the scope of one or more embodiments.

The tuning process includes receiving feedback about how a current event affects an opportunity (operation 502). In some embodiments, the user may explicitly provide feedback for a current event. For example, frontend interface 106 may query the user to determine whether a current event was relevant or not. The user may submit a positive or negative response.

Additionally or alternatively, feedback may be detected based on the outcome of an action. For instance, recommendation engine 114 may determine whether the outcome of an action was successful or unsuccessful. Recommendation engine 114 may generate a label for the example to identify the outcome.

The tuning process further includes identifying the features that are affected by the feedback (operation 504). As previously mentioned, the feedback may affect an individual feature, a group of features, or an entire feature vector. For example, if a user marks a current event as irrelevant, then the sentiment values and/or other feature information extracted from the news article are affected. As another example, if an action resulted in an unsuccessful outcome that was predicted to be successful, then all the features extracted during the evaluation phase may be affected.

The tuning process next adjusts the model weights for the identified features based on the feedback (operation 506). A model weight in this context is a weighting value that is indicative of how predictive a given feature is to a classification. If the feedback indicates that the feature is not relevant, then the model weight may be adjusted downward. Conversely, the model weight may be increased if the feedback is positive.

The tuning process helps the machine learning model improve predication accuracy and evolve over time. The tuning process may be performed periodically, continuously as feedback is received, or on demand, depending on the particular implementation. The evaluation process may use the tuned model to make predictions for opportunities as they arise in the future.

4.0 Example Interfaces for Presenting and Interacting with Opportunity Insights

4.1 Prioritization and Presentation of Opportunities

In some embodiments, the output of the evaluation process is used to generate, update, and render GUIs that are presented to end users. For example, a webpage may display the top n opportunities with the highest probability scores. As another example, a webpage may highlight opportunities for which a recent, positive current event was detected. In other embodiments, the GUI may remove or otherwise filter opportunities that do not satisfy a threshold score. Additionally or alternatively, the GUI may present insight information and link recommended actions, which may speed up response times while improving effectiveness.

In some embodiments, the GUI is updated in real-time as recommendation engine 114 produces new opportunity insights. For example, crawling engine 116 may discover a new news article that is relevant to a particular opportunity. In response, recommendation engine 114 may reevaluate the opportunity to update the score based on the new information. Frontend interface 106 may then update and refresh the GUI presented to the end user to highlight the new insight.

FIG. 6A illustrates an example interface for viewing opportunities and associated insights in accordance with some embodiments. Interface 600 presents a list of pending sales opportunities and associated attributes. Each row corresponds to a different sales opportunity. The opportunity attributes include win probability column 604 for displaying the probability score of the opportunity, name column 606 for displaying the opportunity name, account column 608 for displaying the target entity for the opportunity, amount column 610 for displaying the amount of money involved in the sales opportunity, close date column 612 identifying a timeframe for closing the sale, sales stage column 614 to display the current stage of the sales cycle for the opportunity, recommended actions column 616 for presenting actions that are recommended to be executed. It is noted that the attributes may vary depending on the particular implementation. For example, an application supporting customer service opportunities may present the probability score for the opportunity, information about the target resource that is experiencing problems, previous actions that have been attempted to resolve the problem, etc.

In some embodiments, the user may click on or select the show filters link 602 to filter the opportunities. As previously mentioned, opportunities may be sorted or filtered based on the probability score, reflected in win probability column 604. Interface 600 may display the highest opportunities first. Additionally or alternatively, the filtering may be performed as a function of other attributes. For example a user may request to view the top n presentation opportunities or the top n opportunities with an amount greater than $100,000.

FIG. 6B illustrates an example interface for viewing predicted win probabilities for an opportunity in accordance with some embodiments. This display may be rendered responsive to a user selecting the win probability 618. Upon receiving the selection, opportunity insight 620 is presented that compares an estimated win probability provided by the user to a win probability predicted by the machine learning engine. The exclamation point sign indicates that there is a discrepancy between the two values. In this case, the machine learning engine is predicting a much higher win probability than the user. In other cases, the machine learning engine may predict a lower win probability. The discrepancy may be due to a recent current event and/or other detected patterns by the machine-learning engine. Opportunity insight 620 allows the user to reevaluate the opportunity to determine whether executing the recommended actions would be effective.

4.2 Opportunity Insight Drill-Down and Feedback Interface

In some embodiments, interactive interfaces, such as interface 600, allows users to drill down and view more insights into the pending opportunities. For example, the users drill-down to view more information about opportunities extracted from crawling engine 116 from external web resources. Other insights may include, but are not limited to, identifying a particular social media platform for posting a message that results in the highest positive engagement, suggesting a particular contact that has the highest likelihood of accepting a proposal, and indicating that an opportunity is likely no longer viable. The user may provide feedback for the insights to tune the machine learning model per the tuning process previously described.

FIG. 6C illustrates an example interface for viewing and acting upon an opportunity insight, in accordance with some embodiments. Opportunity insight 622 suggest changing the primary contact to an IT decision maker. Opportunity insight 622 further provides button 624, which links to an interface allowing the user to change the primary contact. Upon selecting button 624, the user may be presented with a list of contacts for the account that are stored in the system. The user may then select a contact from the list and change the primary contact for the opportunity to the one selected from the list. Opportunity insight further allows a user to provide feedback. The user may hit button 626 to indicate that the opportunity insight is a good suggestion and button 628 to indicate that the insight is not relevant. The feedback may be returned to recommendation engine 114, which may update the machine learning model by adjusting the relevant feature weights.

FIG. 6D illustrates another example interface for viewing and acting upon an opportunity insight, in accordance with some embodiments. Opportunity insight 630 presents a summary of a current event matching the search criteria on the opportunity watchlist. The user may hit button 632 to review a product catalog. Upon hitting button 632, the user may be presented with a list of products that are most likely to be relevant based on the article. For example, the products that are most relevant to the area of industry identified in the article may be presented. Button 634 and button 636 allow the user to provide feedback, similar to button 626 and 628.

FIG. 6E illustrates another example interface for viewing and acting upon an opportunity insight, in accordance with some embodiments. Opportunity insight 638 recommends verifying that the opportunity is still viable given the total number of days that have lapsed since the opportunity was first detected. Button 640 allows a user to view a summary of the opportunity to verify whether it should be transitioned to an inactive state or not. Button 642 and button 644 allow the user to provide feedback, similar to the buttons for the opportunities insights described above.

Figure 7:
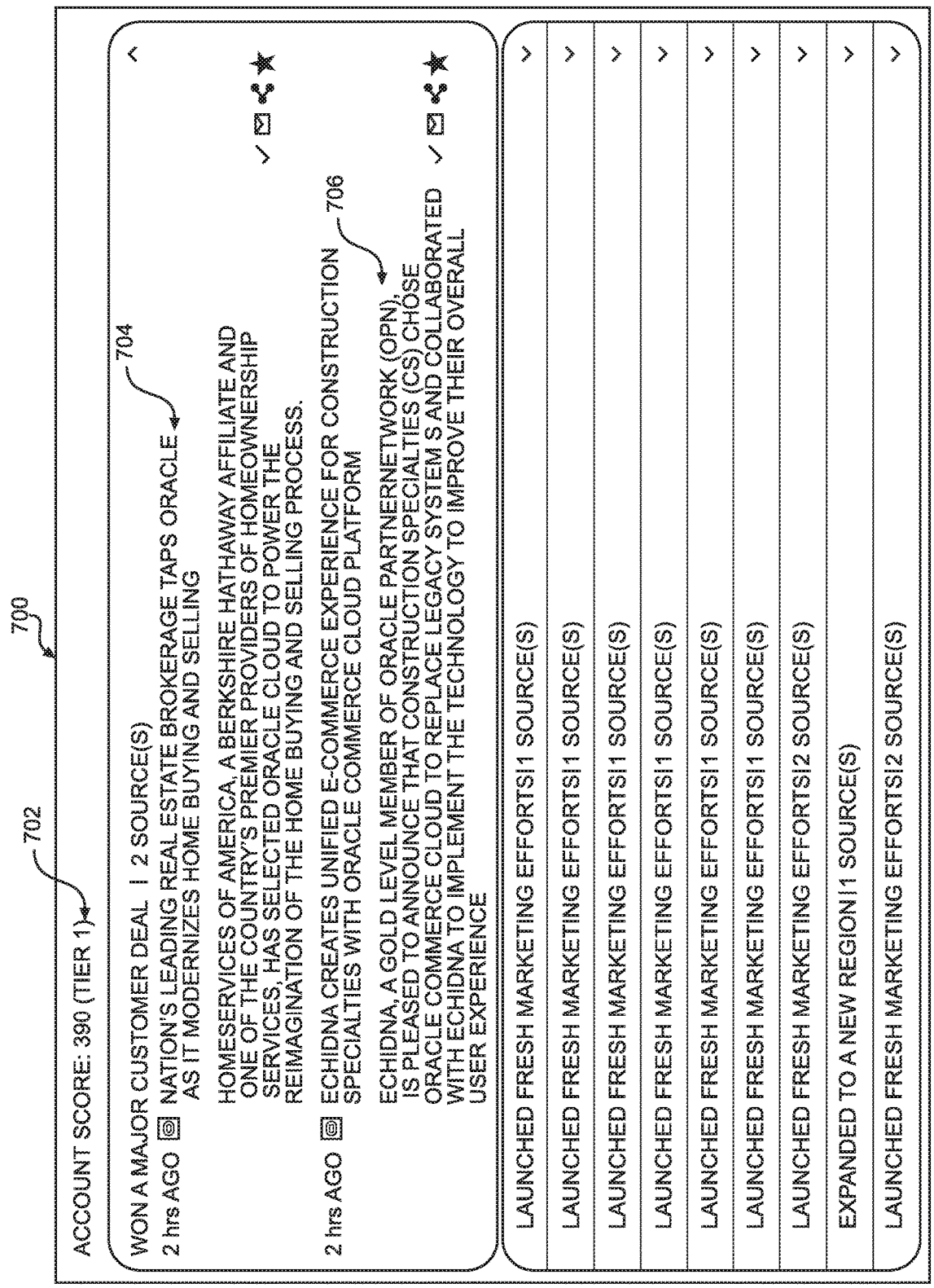
FIG. 7 illustrates an interface for viewing summary information for current events related to an opportunity in accordance with some embodiments.

FIG. 7 illustrates an interface for viewing summary information for current events related to an opportunity in accordance with some embodiments. Interface 700 presents a list that identifies relevant current events matching a watchlist for a target account. The summary includes account identification information 702 and a list of matching events. The events are categorized by event type, such as "Won Customer Deal", "Launched Fresh Marketing Effort" and "Expanded into a New Region". Each event summary identifies the sources extracted by crawling engine 116 for the event. A user may select an event to view more information from the sources. For example, upon selecting the first "Won Customer Deal" event, the user may be presented with summary 704 and summary 706. Each of these summaries provides a brief description of the event as extracted from a different source. The summaries may be hyperlinked directly to the sources such that a user may navigate to the corresponding webpages upon selection of the hyperlink. The summary information allows a user to quickly gain an overview of current events that are relevant to an opportunity and make informed decisions on what actions to execute.

5.0 Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as HTTP. The requests are communicated through an interface, such as a client interface (such as a web browser), a program interface, or an API.

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants.

In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6.0 Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other micro services. Other micro services may perform responsive actions based on the above techniques, including, but not limited to, deploying additional resources, adjusting system configurations, and/or generating GUIs.

Actions

In some embodiments, a plugged-in microservice application may expose actions to the micro services manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the micro services manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7.0 Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates computer system 800 upon which some embodiments may be implemented. Computer system 800 includes bus 802 or other communication mechanism for communicating information, and a hardware processor 804 coupled with bus 802 for processing information. Hardware processor 804 may be, for example, a general purpose microprocessor.

Computer system 800 also includes main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes read only memory (ROM) 808 or other static storage device coupled to bus 802 for storing static information and instructions for processor 804. Storage device 810, such as a magnetic disk or optical disk, is provided and coupled to bus 802 for storing information and instructions.

Computer system 800 may be coupled via bus 802 to display 812, such as a cathode ray tube (CRT) or light emitting diode (LED) monitor, for displaying information to a computer user. Input device 814, which may include alphanumeric and other keys, is coupled to bus 802 for communicating information and command selections to processor 804. Another type of user input device is cursor control 816, such as a mouse, a trackball, touchscreen, or cursor direction keys for communicating direction information and command selections to processor 804 and for controlling cursor movement on display 812. Input device 814 typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 800 can receive the data on the network line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

8.0 Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions which, when executed by one or more hardware processors cause:
    detecting an opportunity to perform an action using at least one computing resource;
    responsive to detecting the opportunity to perform the action using the at least one computing resource, generating a set of search criteria to search for current events related to the opportunity, wherein the set of search criteria direct a search of a web crawler and specify conditions under which the web crawler finds matching current events related to the opportunity;
    searching, by the web crawler, a set of external web resources for current events satisfying the set of search criteria;
    generating, using a machine learning model based on at least one current event that satisfies the set of search criteria, a score representing a likelihood of success for the action using the at least one computing resource;
    receiving feedback that is indicative of how the at least one current event affects the likelihood of success for the action using the at least one computing resource;
    tuning the machine learning model for future recommendations based at least in part on the feedback, wherein tuning the machine learning model for future recommendations comprises updating at least one weight using at least one tag extracted by the web crawler from at least one external web resource, of the set of web resources, matching the set of search criteria.

2. The one or more non-transitory computer-readable media of claim 1, wherein the instructions further cause:
generating sentiment information for the at least one current event;
forming a feature vector based at least in part on the sentiment information;
wherein generating, using the machine learning model based on at least one current event that satisfies the set of search criteria, the score comprises determining, as a function of the feature vector and the machine learning model, a probability that the action using the at least one computing resource will cause a particular result.

3. The one or more non-transitory computer-readable media of claim 2, wherein the sentiment information is generated using a trained classification model that classifies the at least one current event as having a positive sentiment, a negative sentiment, or a neutral sentiment.

4. The one or more non-transitory computer-readable media of claim 2, wherein the feature vector includes values for one or more features extracted from the sentiment information and one or more features extracted from non-sentiment information about the at least one current event.

5. The one or more non-transitory computer-readable media of claim 1, wherein the instructions further cause:
generating a set of tags for the at least one current event;
forming a feature vector based at least in part on the set of tags;
wherein generating, using the machine learning model based on at least one current event that satisfies the set of search criteria, the score comprises determining, as a function of the feature vector and the machine learning model, a probability that the action using the at least one computing resource will cause a particular result.

6. The one or media of claim 1, wherein the score is further generated, based at least in part, on how much time has lapsed since the opportunity was detected.

7. The one or media of claim 1, wherein the feedback is received by a user through a user interface and indicates whether the at least one current event is relevant to the action using the at least one computing resource.

8. The one or more non-transitory computer-readable media of claim 1, wherein the instructions further cause:
receiving, through a user interface, a request to perform the action using the at least one computing resource;
responsive to the request, performing the action using the at least one computing resource;
wherein the feedback identifies an outcome of the action using the at least one computing resource.

9. The one or more non-transitory computer-readable media of claim 1, wherein the action using the at least one computing resource comprises posting a message on a social media platform.

10. The one or more non-transitory computer-readable media of claim 1, wherein the action using the at least one computing resource comprises sending an electronic message to one or more recipients using one or more web services.

11. The one or more non-transitory computer-readable media of claim 1, wherein the action using the at least one computing resource comprises configuring at least one software or hardware resource.

12. The one or more non-transitory computer-readable media of claim 1, wherein the at least one weight is further associated with at least one node or cluster in the machine learning model.

13. The one or more non-transitory computer-readable media of claim 1, wherein the instructions further cause:
generating a label for the action based on the feedback;
wherein tuning the machine learning model for future recommendations comprises retraining the machine learning model based on the label for the action.

14. The one or more non-transitory computer-readable media of claim 1, wherein the instructions further cause:
generating a recommendation for the action based at least in part on the score;
presenting the recommendation for the action through a user interface.

15. The one or more non-transitory computer-readable media of claim 1, wherein the instructions further cause:
determining, based at least in part on whether the score satisfies a threshold, whether to include the action in a set of recommended actions using the at least one computing resource;
presenting the set of recommended actions using the at least one computing resource through a user interface.

16. The one or more non-transitory computer-readable media of claim 1, wherein the instructions further cause:
generating summary information for the at least one current event; and
presenting, through a user interface, the summary information with a recommendation for the action.

17. The one or more non-transitory computer-readable media of claim 1, wherein the opportunity is associated with a particular entity and the instructions further cause:
responsive to detecting the opportunity, determining whether a watchlist including the set of search criteria has already been generated for the opportunity;
responsive to determining that the watchlist has not been generated, generating the watchlist for the opportunity, wherein the watchlist periodically or continuously triggers the web crawler to search the set of external web resources for the current events satisfying the set of search criteria;
wherein the web crawler searches for current events that affect the particular entity;
determining, using a trained classification model, whether the at least one current event that satisfies the set of search criteria has a positive, negative, or neutral impact on the particular entity;
forming a feature vector that includes one or more features indicative of whether the at least one current event has a positive, negative, or neutral impact on the particular entity;
wherein generating, using the machine learning model based on at least one current event that satisfies the set of search criteria, the score comprises determining, as a function of the feature vector and the machine learning model, a probability that the action using the at least one computing resource will cause a particular result.

18. A system comprising:
one or more hardware processors;
one or more non-transitory computer-readable media storing instructions which, when executed by the one or more hardware processors cause operations comprising:
detecting an opportunity to perform an action using at least one computing resource;
responsive to detecting the opportunity to perform the action using the at least one computing resource, generating a set of search criteria to search for current events related to the opportunity, wherein the set of search criteria direct a search of a web crawler and specify conditions under which the web crawler finds matching current events related to the opportunity;

searching, by the web crawler, a set of external web resources for current events satisfying the set of search criteria;

generating, using a machine learning model based on at least one current event that satisfies the set of search criteria, a score representing a likelihood of success for the action using the at least one computing resource;

receiving feedback that is indicative of how the at least one current event affects the likelihood of success for the action using the at least one computing resource;

tuning the machine learning model for future recommendations based at least in part on the feedback, wherein tuning the machine learning model for future recommendations comprises updating at least one weight using at least one tag extracted by the web crawler from at least one external web resource, of the set of web resources, matching the set of search criteria.

19. A method comprising:

detecting an opportunity to perform an action using at least one computing resource;

responsive to detecting the opportunity to perform the action using the at least one computing resource, generating a set of search criteria to search for current events related to the opportunity, wherein the set of search criteria direct a search of a web crawler and specify conditions under which the web crawler finds matching current events related to the opportunity;

searching, by the web crawler, a set of external web resources for current events satisfying the set of search criteria;

generating, using a machine learning model based on at least one current event that satisfies the set of search criteria, a score representing a likelihood of success for the action using the at least one computing resource;

receiving feedback that is indicative of how the at least one current event affects the likelihood of success for the action using the at least one computing resource;

tuning the machine learning model for future recommendations based at least in part on the feedback, wherein tuning the machine learning model for future recommendations comprises updating at least one weight using at least one tag extracted by the web crawler from at least one external web resource, of the set of web resources, matching the set of search criteria.

20. The one or more non-transitory computer-readable media of claim 1, wherein the search criteria identify a current stage of the opportunity and one or more terms based on a type of opportunity for which a watchlist is created.

* * * * *

UNITED STATES PATENT AND TRADEMARK OFFICE
CERTIFICATE OF CORRECTION

PATENT NO. : 11,960,977 B2
APPLICATION NO. : 16/447849
DATED : April 16, 2024
INVENTOR(S) : Kumar et al.

It is certified that error appears in the above-identified patent and that said Letters Patent is hereby corrected as shown below:

In the Drawings

On sheet 1 of 12, in Fig. 1, under Reference Numeral 120, Line 2, delete "RESPOSITORY" and insert -- REPOSITORY --, therefor.

On sheet 2 of 12, in Fig. 2, under Reference Numeral 216, Line 2, delete "RECOMMENDEDATIONS" and insert -- RECOMMENDATIONS --, therefor.

On sheet 5 of 12, in Fig. 5, under Reference Numeral 502, Line 3, delete "OPPORTUNTY" and insert -- OPPORTUNITY --, therefor.

In the Specification

In Column 12, Line 30, delete ""4"," and insert -- "-1", --, therefor.

In Column 13, Line 41, delete "runSentimentAnlaysis(news)" and insert -- runSentimentAnalysis(news) --, therefor.

In Column 21, Line 28, delete "micro services." and insert -- microservices. --, therefor.

In Column 21, Line 28, delete "micro services" and insert -- microservices --, therefor.

In Column 21, Line 33, delete "micro services" and insert -- microservices --, therefor.

In Column 21, Line 49, delete "micro services" and insert -- microservices --, therefor.

Signed and Sealed this
Sixth Day of August, 2024

Katherine Kelly Vidal
*Director of the United States Patent and Trademark Office*

In the Claims

In Column 25, Line 34, in Claim 6, delete "one or media" and insert -- one or more non-transitory computer-readable media --, therefor.

In Column 25, Line 37, in Claim 7, delete "one or media" and insert -- one or more non-transitory computer-readable media --, therefor.